United States Patent [19]

Gander

[11] 3,853,962

[45] Dec. 10, 1974

[54] NOVEL METHACRYLATE MONOMER

[75] Inventor: Robert Johns Gander, Whitehouse, N.J.

[73] Assignee: Johnson & Johnson, New Brunswick, N.J.

[22] Filed: Oct. 29, 1973

[21] Appl. No.: 410,731

Related U.S. Application Data

[62] Division of Ser. No. 223,369, Feb. 3, 1972, abandoned.

[52] U.S. Cl....... 260/486 R, 260/42.15, 260/998.11
[51] Int. Cl.............................................. C07c 69/54
[58] Field of Search ......... 260/486 B, 486 R, 42.15, 260/42.28, 998.11

[56] References Cited
UNITED STATES PATENTS

| | | |
|---|---|---|
| 3,066,112 | 11/1962 | Bowen ............................ 260/42.15 |
| 3,494,939 | 10/1970 | Smith .............................. 260/486 B |
| 3,539,533 | 11/1970 | Lee et al. ............................. 260/47 |
| 3,632,854 | 1/1972 | Randall .......................... 260/486 B |
| 3,663,599 | 5/1972 | Koshimura et al. ............. 260/486 B |
| 3,676,398 | 7/1972 | D'Alelio .......................... 260/486 B |
| 3,689,532 | 9/1972 | Emmons et al. ................ 260/486 B |
| 3,708,524 | 1/1973 | Murayama et al. ............. 260/486 B |

*Primary Examiner*—Allan Lieberman
*Assistant Examiner*—T. DeBenedictis, Sr.

[57] ABSTRACT

Improved dental restorative cements are prepared from a new class of methacrylate monomer 1,3-bis [2-,3-di(methacryloxy)-propoxy]-benzene (RGTMA). When the monomer is utilized as a binder for inorganic filler materials such as silane-treated crystal quartz filler, composite dental restoratives having substantially improved compressive strength and related physical strength properties are produced.

1 Claim, No Drawings

NOVEL METHACRYLATE MONOMER

This is a division, of application Ser. No. 223,369, filed Feb. 3, 1972 now abandoned.

BACKGROUND OF THE INVENTION

1. FIELD OF THE INVENTION

This invention relates to improved cement compositions useful as dental restoratives, the compositions containing a novel monomeric binder. More particularly, it relates to improved dental compositions of the composite type wherein a novel methacrylate monomer, 1,3-bis[2,3-di(methacryloxy)-propoxy]-benzene (RGTMA), is employed as the binder or as a portion of the binder for the inorganic filler.

While the utility of the novel methacrylate monomer of the present invention is described in connection with particular embodiments advantageously employed as binders for dental restorative compositions, it should be understood that the utility of the monomer is not necessarily limited thereto. It may also be employed wherever its unique properties may be advantageously utilized, as those skilled in the art will recognize in the light of this disclosure.

2. Description of the Prior Art

When said monomer is employed in dental composites for the direct filling of teeth, improved results are surprisingly achieved, as contrasted with certain prior-art alternatives.

Typical of the prior art is the subject matter of U.S. Pat. No. 3,066,112. It discloses dental filling materials comprising vinyl silane-treated fused silica and a binder consisting of the condensation product of two moles of methacrylic acid and the diglycidyl ether of bisphenol A or alternatively two moles of glycidyl methacrylate with one mole of bisphenol A, the binder being referred to as BIS-GMA. Because of high viscosity, the BIS-GMA must be diluted to the consistency of a medium syrup by use of suitable reactive monomers, e.g., methyl methacrylate, ethylene glycol dimethacrylate, and tetraethylene glycol dimethacrylate. In use as a dental restorative, the treated silica powder containing a suitable catalyst such as benzoyl peroxide is mixed with the syrupy liquid organic material which contains a suitable activator; and the mixed aggregate is promptly placed in the cavity to be filled wherein it hardens by polymerization of the organic material.

Such prior-art dental restorative compositions have become known as composites and represent a very useful class of restorative materials in modern dental technology, a number of which are now commercially available. However, as documented by Mr. Frank H. Freeman of Kerr Manufacturing Company, Detroit, Michigan in a paper delivered in Houston, Texas on Mar. 21, 1969 before the Dental Materials Group, North American Division, International Association for Dental Research, restoratives of this type generally had compressive strengths in the range of about 28,000 to 34,000 pounds per square inch. For certain purposes such as posterior restorations, higher compressive strengths are desired, with the result that silver amalgam restoratives were generally preferred over the composite type restorative materials for posterior teeth because of the higher compressive strengths attainable, such as on the order of 40,000 psi or more.

OBJECTS OF THE INVENTION

It is therefore an object of this invention to provide a new composition of matter which is particularly suited for use as an improved binder in dental restorative compositions of the composite type. It is a related object to provide dental restorative compositions of the composite type which exhibit desirably high compressive strength. It is a further object to provide dental restorative compositions which have all the advantages associated with prior-art composite-type restorative compositions and fewer of the shortcomings.

It is another object to provide a binder for composite-type dental restoratives which does not require the addition of reactive diluents to control viscosity. It is still another object to provide a binder for composite-type dental restorative compositions which may be admixed with prior-art binders to improve overall strength characteristics. These and other objects of the present invention will become apparent as the detailed description thereof proceeds.

SUMMARY OF INVENTION

These objects are achieved by utilizing in the monomeric binder system the new monomer 1,3-bis[2,3-di(methacryloxy)-propoxy]-benzene (RGTMA). To form the restorative composite the binder is mixed with a major proportion of inorganic filler material such as silane-treated fused silica, the latter generally making up more than 50 percent by weight of the resulting composite, e.g., about 70 to 90 percent, preferably about 75 to 85 percent, by weight. After polymerization and setting, the composite forms a hard, water-insoluble filling material having desirably high compressive strength. Further details are set forth in the following subsections and illustrative examples.

The Monomer Binder of the Invention

As above indicated, the novel monomeric binder is 1,3-bis[2,3-di(methacryloxy)-propoxy]-benzene. This monomer may be represented by the following formula:

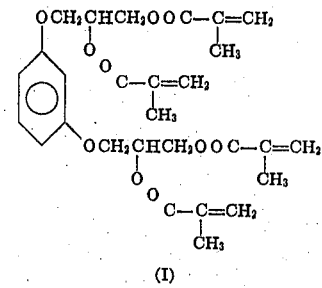

(I)

The monomer is produced according to the following scheme in which the diglycidyl ether of resorcinol is condensed with methacrylic acid to produce a dimethacrylate which is then esterified with metacrylyl chloride:

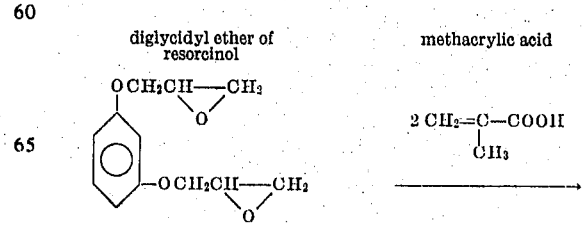

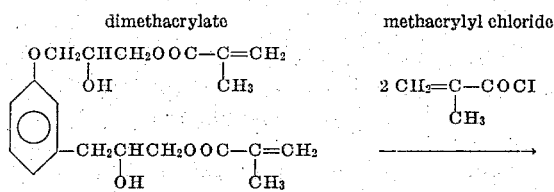

For convenience in discussion, this monomer is also referred to herein by the abbreviation RGTMA. Homopolymers of the 1,3-bis[2,3-di(methacryloxy)-propoxy]-benzene (RGTMA) monomer are found to have an index of refraction of 1.590. This is a relatively high index of refraction as compared to most monomers that might be used in binder systems for filled composite restoratives and makes this novel monomer particularly useful for blending with other monomers having homopolymers of lower refractive index where it is desirable to substantially match the refractive index of the binder polymer with that of the filler where fillers such as quartz, having relatively high refractive indexes are used. The refractive index of quartz being 1.545.

Dental Restorative Compositions of the Invention

The new methacrylate ester monomer 1,3-bis[2,3-di(methacryloxy)-propxy]-benzene (RGTMA) described above affords particular advantages when used as a binder for inorganic filler materials. In particular, with use of the new monomer, hard, water-insoluble dental restorative compositions having desirably high compressive strengths can be readily prepared. Moreover, the low viscosity of the monomer composition permits its use in the formulation of composite restorative compositions without the need of viscosity reducing diluents. Also, it will be understood that other polymerizable monomers, including the aforementioned BIS-GMA, can be included in the dental compositions along with the new monomer of this invention, if desired, and improvements in compressive strength be obtained.

The 1,3-bis[2,3-di(methacryloxy)-propoxy]-benzene (RGTMA) should, however, be present in the binder system in amounts of at least 10 percent by weight of the binder monomers.

As already indicated, composite restorative compositions in accordance with this invention are prepared by mixing the said monomer composition with a major proportion of a particulate inorganic filler material, the latter generally making up more than 50 percent by weight of the resulting composite, e.g., about 70 to 90 percent, preferably about 75 to 85 percent, by weight. A variety of inorganic filler materials can be employed. Representative of such materials are silica, glass beads, aluminum oxide, crystalline quartz and the like. The particle size of the filler material generally ranges from submicron to about 125 microns with the average particle size being in the range of about 15 to 30 microns and preferably is in the range of about 20 to 25 microns.

The particulate inorganic filler material should preferably be treated with a keying agent to improve the binding of the resin thereto. Keying agents and the method of use can be as described in the aforementioned U.S. Pat. No. 3,066,112. Keying agents which have been found to be particularly suitable are the high performance ethylenically unsaturated organosilane compounds such as gamma-methacryloxypropyltrimethoxysilane, vinyltrichlorosilane, vinyltriethoxysilane, vinyltrimethoxysilane, vinyltriacetoxysilane and the like.

Initiation of polymerization which causes the composite to set into a hard mass is conveniently effected at room temperature, e.g. about 25° to 30°C, by inclusion in the formulation of a peroxide polymerization catalyst and an activator which functions to cause a rapid decomposition of peroxide with the resultant formation of polymerization-inducing free radicals.

A variety of peroxide polymerization catalysts as known in the art can be used, benzoyl peroxide, 2-4-dichlorobenzoyl peroxide and 4-chlorobenzoyl peroxide being representative thereof. The catalyst is generally employed in amounts from 0.1 to 1.0 percent by weight based on the weight of active monomer or monomers present.

Similarly, an activator or accelerator material which causes decomposition of the catalyst is employed in the formulation, such as, for example, N,N-dialkylanilines and N,N-dialkyltoluidines. The activator is generally employed in amounts ranging from about 0.1 to 1.0 weight percent based on the weight of the monomer or monomers present. While various activators can be used, amine activators of the type represented by the following formula are particularly effective:

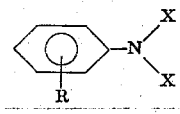

wherein R is hydrogen or methyl and X is methyl, ethyl or hydroxyethyl. A preferred activator is N,N-di(2-hydroxyethyl)-p-toluidine.

For convenience in use, the composite dental filling compositions can be formulated in the form of pastes adapted for ready mixing by the dentist or other user. Thus, a paste (A) can be formulated containing the resin-forming monomer, inorganic filler and activator while a second paste (B) can contain the monomer, filler and peroxide, approximately the same proportions of monomer and filler being present in each paste for convenience, although not necessarily limited to such proportions. Upon mixing of the two pastes, polymerization of the monomer or monomers is initiated with the working or hardening time being variable and controllable by use of more or less of the activator.

A typical formulation for pastes A and B in this embodiment would be as follows:

| Component | Proportion, Wt. % Paste A | Paste B |
|---|---|---|
| Silane-Treated Quartz | 80.0 | 80.0 |
| 1,3-bis[2,3-di(methacryloxy)-propoxy]-benzene (RGTMA) | 20.0 | 20.0 |
| N,N-di(2-hydroxyethyl)-p-toluidine | 0.02 | — |
| Benzoyl Peroxide | — | 0.02 |

EXAMPLES

The following examples, which are presented to amplify the description set forth hereinabove and are not to be considered limiting, illustrate the preparation of 1,3-bis[2,3-di(methacryloxy)-propoxy]-benzene and the formulation and properties of representative dental restorative compositions produced therefrom.

EXAMPLE 1

New Monomer Composition

In a 2-liter, 3-neck flask are placed 600 g. (5.10 epoxy equivalents) of resorcinol diglycidyl ether; 430 g. (5.00 moles) methacrylic acid; 5.0 g. triphenylphosphine and 0.5 g. p-methoxyphenol. A water condenser is mounted on the flask and the contents are stirred continuously for 48 hours while heating in an oil bath at 80°–85°C. The reaction mixture at this point is essentially 1,3-bis(3-methacryloxy-2-hydroxypropoxy)-benzene, a yellow, viscous liquid with the following properties:

Weight per epoxy equivalent: 33,643
Acid Number: 3.2 mg. KOH/gram
$n_D^{30}$ 1.5268

A solution of the following is dried overnight over 10 grams of Type 4A molecular sieves:

1,3-bis(3-methacryloxy-2-hydroxpropoxy)-benzene, 100 g. (0.51 mole); acetone, Reagent Grade, 150 ml.; triethylamine, 51.6 g. (0.51 mole); p-methoxyphenol, 0.04 g. The dried solution is filtered into a 500-ml., 3-neck flask bearing a thermometer, condenser, mechanical stirrer and dropping funnel. The solution is stirred and cooled intermittently in an ice-and-water bath to maintain the temperature in the 24° to 30°C. range while 53.2 g (0.51 mole) of redistilled methacrylyl chloride (b.p. 43°/96 mm.) is added during one hour.

The reaction mixture is poured into 600 g. of water and 200 g. of ice. The water is extracted with two 400-ml. portions of diethyl ether. The combined ether extracts are washed successively with two 100-ml. portions of 5 percent sodium bicarbonate solution and two 100-ml. portions of water. The washed ether solution is dried over molecular sieves, filtered, and 0.012 g. of phenothiazine added. The ether is evaporated at water pump pressures and the last of it removed at 4 mm. pressure. The product, 1,3-bis[2,3-di(methacryloxy)-propoxy]-benzene (RGTMA), is a mobile yellow liquid with a pleasant odor which weighs 73.3 g.; $n_D^{30}$ 1.5058. When the monomer is polymerized, homopolymer formed of the same has a refractive index of 1.590.

EXAMPLE 2

Dental Restorative Utilizing Novel Monomer (RGTMA) In Composite With 80 Percent Quartz Filler Crystal quartz is ground in a porcelain ball mill to a size which will pass through a 200-mesh screen. The size range of the particles is from 75 microns to less than one micron with a median size of about 20 microns. The ground quartz (500 grams) is placed in 1000 milliliters of 20 percent hydrochloric acid and heated to 80°C for an hour. The acid is filtered, and the quartz is washed with water until effluent water reaches pH 6 to 7. The quartz is then dried in an open glass tray at 130°F.

A water solution of silane is prepared by placing 0.4 milliliter of acetic acid and 10 grams of gamma-methacryloxpropyltrimethoxysilane in 200 milliliters of water and stirring rapidly at room temperature. A slurry is made of the acid-washed quartz and the silane solution. The liquid is then sucked from the quartz on a ceramic filter, so as little water as possible remains on the quartz. The quartz is again dried at 130°F on a glass tray. It is stirred frequently during drying to prevent caking. The resulting silane-treated quartz is employed in preparing two pastes hereinafter described.

Two pastes are prepared which are substantially identical in composition except that one contains benzoyl peroxide as an additional component and the other contains N,N-di(2-hydroxyethyl)-p-toluidine. Monomer, 1,3-bis[2,3-di(methacryloxy)-propoxy]-benzene (RGTMA), prepared as set forth in Example 1, is the only monomer in this system. The compositions of the pastes are as follows:

| Paste A | Parts by Weight |
| --- | --- |
| 1,3-bis[2,3-di(methacryloxy)-propoxy]-benzene (RGTMA) | 6.40 |
| N,N-di(2-hydroxyethyl)-p-toluidine | 0.10 |
| Silane-treated crystal quartz | 26.00 |
| Paste B | |
| 1,3-bis[2,3-di(methacryloxy)-propoxy]-benzene (RGTMA) | 6.30 |
| N,N-di(2-hydroxyethyl)-p-toluidine | 0.20 |
| Silane-treated crystal quartz | 26.00 |

Equal parts by weight of Pastes A and B are mixed for 30 seconds and then packed into cylindrical Teflon molds, 0.158 inch in diameter and about 0.31 inch in length, the ends of the molds being covered with smooth glass plates. After three minutes hardening occurs, and the molds are immersed in water at 100°F for 24 hours. The composite cylinders, which contain 78 percent quartz filler, are then expelled from the Teflon molds, accurately measured, and tested. Ten cylinders are crushed in compressive strength tests using an Instron tester, and another ten cylinders are crushed in determination of the diametrical tensile strength. Compressive strength is found to be 41,406 ± 1,384 psi and tensile strength is found to be 7,174 ± 243 psi.

This two-paste system is used to place a mesioocclusal Class II restoration in the maxillary right second premolar of a dental patient. The tooth is prepared for filling by conventional drilling techniques such as those used prior to placing silver amalgam restorations. The base of the cavity is lined with a zinc oxide-eugenol cement base. A metal matrix band is then placed around the tooth, and wedges are placed to avoid overhangs and to provide proper axial contour.

Approximately equal amounts of Pastes A and B are mixed on a coated paper mixing pad for about 20 seconds. The mixed paste is then inserted using normal packing pressure to fill under-cuts. The restorative gels to a hard composition about two minutes after insertion. Five minutes after insertion the matrix band is carefully removed. The filling is finished with a fine, water-cooled diamond stone, then with a fine green stone, and finally with a lubricated fine white stone. The finished restoration is strong and durable.

EXAMPLE 3

Restorative Cement Compositions of 80 Percent Crystalline Quartz Filler Having Matched Index of Refraction Following the procedure of Example 2, restorative cement compositions are prepared in which the binder system is formed of a mixture of the novel monomer RGTMA with other monomers to obtain a binder polymer having a refractive index substantially matching that of the crystalline quartz filler. The cement compositions are set forth in the following Table.

TABLE FOR EXAMPLE 3

| Binder - 20% By Wt. of Restorative Composite<br>Monomer | Parts by Wt. Based on Binder Resin | Refractive Index of Binder Polymer | Quartz Filler 80% By Wt. of Refractive Index | Refractive Index of Cured Composite |
|---|---|---|---|---|
| 1,3-Butanedoil dimethacrylate (BGDMA) | 33.4 | 1.545 | 1.545 | 1.545 ± 0.005 |
| 1,3-bis[2,3-di(methacryloxy)-propoxy]-benzene (RGTMA) | 66.6 | | | |
| Triethylene glycol dimethacrylate (TEGDM) | 44.5 | 1.545 | 1.545 | 1.545 ± 0.005 |
| 1,3-bis[2,3-di(methacryloxy)-propoxy]-benzene (RGTMA) | 55.5 | | | |

The advantages of dental restorative compositions in accordance with the invention are apparent from the foregoing. It will be seen that use of the new monomer composition of the invention as a binder with inorganic filler materials results in compositions having significantly improved compressive strengths and appearance. Such dental restorative compositions are particularly desired for use in filling teeth such as in posterior restorations where high compressive strength is desired and are particularly useful in preparing restorative compositions using quartz as the filler to obtain restorative compositions of excellent appearance having substantially matched indexes of refraction.

From the above description, it is apparent that the objects of the present invention have been achieved. While only certain embodiments have been illustrated, many alternative modifications will be apparent from the above description to those skilled in the art. These and other alternatives are considered within the spirit and scope of the present invention, and coverage thereof is intended by the claims of any patents based on this application.

Having described the invention, what is claimed is:

1. As a new composition of matter, the methacrylate monomer, 1,3-bis[2,3-di(methacryloxy)-propoxy]-benzene.

* * * * *

UNITED STATES PATENT OFFICE
CERTIFICATE OF CORRECTION

Patent No. 3,853,262  Dated December 10, 1974

Inventor(s) Robert Johns Gander

It is certified that error appears in the above-identified patent and that said Letters Patent are hereby corrected as shown below:

In Column 3, after the formula, add the following: 1,3-bis [2,3-di(methacryloxy)-propoxy] -benzene
        (Formula 1)

In Column 4, line 1, "gamma" should read --- *gamma* ---.

In Column 4, line 37, "p" should read --- *p* ---.

In Column 4, in Table, "p" should read --- *p* ---.

In Column 5, line 10, "p" should read --- *p* ---.

In Column 5, line 24, "p" should read --- *p* ---.

In Column 5, line 19, "$n_d^{30}$" should read --- $n_d^{30}$ ---.

In Column 5, line 43, "$n_d^{30}$" should read --- $n_d^{30}$ ---.

In Column 5, line 62, "gamma" should read --- *gamma* ---.

In Column 5, line 63, "methacryloxpropyl" should read --- methacryloxypropyl ---.

In Column 6, line 8, "p" should read --- *p* ---.

In Column 6, in Table, "p" should read --- *p* ---.

In Column 6, in Table, second occurrence, "p" should read --- *p* ---.

In Column 7, Table for Example 3, "Butanedoil" should read --- Butanediol ---.

Signed and sealed this 20th day of May 1975.

(SEAL)
Attest:

RUTH C. MASON
Attesting Officer

C. MARSHALL DANN
Commissioner of Patents
and Trademarks